United States Patent
Moebs et al.

[11] Patent Number: 6,029,683
[45] Date of Patent: Feb. 29, 2000

[54] PRESSURIZED GAS TANK VALVE PLUG

[75] Inventors: Ricky A. Moebs, Phoenix; Patrick W. Breslin, Peoria, both of Ariz.

[73] Assignee: U-Haul International, Inc., Phoenix, Ariz.

[21] Appl. No.: 08/858,010

[22] Filed: May 16, 1997

[51] Int. Cl.⁷ .......................... F16K 43/00; F16K 13/00; F16L 55/10
[52] U.S. Cl. .................. 137/15; 137/315; 137/614.2; 138/89; 138/96 T; 251/215; 220/288
[58] Field of Search ............... 137/1, 613, 614.2, 137/883, 15, 315, 322; 251/216, 215; 138/89, 96 T, 96 R, 94; 220/287, 288

[56] References Cited

U.S. PATENT DOCUMENTS

| | | | |
|---|---|---|---|
| 1,347,951 | 7/1920 | Hohmann | 251/216 |
| 1,519,231 | 12/1924 | Benjamin | 251/216 |
| 1,674,998 | 9/1928 | Spang . | |
| 2,172,311 | 9/1939 | Thomas | 137/322 |
| 2,238,643 | 4/1941 | Hicks | 138/96 |
| 2,277,713 | 3/1942 | Parker | 138/96 |
| 2,283,970 | 5/1942 | Buttner | 137/322 |
| 2,361,865 | 10/1944 | Norway | 137/614.2 |
| 2,385,489 | 9/1945 | Benz | 137/614.2 |
| 2,713,874 | 7/1955 | Sundstrom | 137/322 |
| 2,930,118 | 3/1960 | Higgins | 29/528 |
| 3,561,477 | 2/1971 | Pinto et al. | 137/613 |
| 3,661,291 | 5/1972 | Hetzer | 220/42 |
| 3,893,487 | 7/1975 | Engelking | 138/89 |
| 4,237,917 | 12/1980 | Merrifield | 137/613 |
| 4,402,340 | 9/1983 | Lockwood, Jr. | 137/322 |
| 4,986,502 | 1/1991 | Ceroke | 251/216 |
| 5,297,693 | 3/1994 | Perkey | 220/328 |
| 5,333,387 | 8/1994 | Reese | 251/216 |
| 5,368,181 | 11/1994 | Myers | 251/216 |
| 5,509,435 | 4/1996 | Rutan et al. | 251/216 |

FOREIGN PATENT DOCUMENTS 870053  3/1953  Germany ............... 137/614.2

Primary Examiner—George L. Walton
Attorney, Agent, or Firm—Jeffer, Mangels, Butler & Marmaro LLP

[57] ABSTRACT

There is provided a pressurized gas tank valve plug which can safely and effectively fit and seal a first pressurized gas tank valve and a second pressurized gas tank valve each valve having a valve stem of differing interior depth.

23 Claims, 2 Drawing Sheets

PRESSURIZED GAS TANK VALVE PLUG

FIELD OF THE INVENTION

The present invention relates to a pressurized gas tank valve plug.

BACKGROUND OF THE INVENTION

Various gases, in particular hydrocarbons; such as, propane, butane and the like, are commonly stored in pressurized tanks for use, typically as fuels. The pressurized tanks contain valves through which the outflow of gas from the tank can be controlled. When pressurized tanks are not in use such valves are typically plugged in order to block the entry of dirt and to prevent damage to the interior of the valve and to help seal leakage of gas from the valve. For at least one type of pressurized gas tank, propane tanks, the type of valve unit in use has evolved over time into two different types of valve units, an old style valve unit referred to as a POL style valve and a newer style valve referred to as Type 1 connection valve. However, the Type 1 connection valve has not supplanted the POL valve, rather, both styles of valves are commonly in use. The same facility can even have propane tanks which use both styles of valves.

The POL valve unit has a single-seal valve which has a handwheel that when opened will freely discharge gas from a source of gas, such as a pressurized tank. The POL valve unit has a valve body which has a valve stem having an orifice through which the gas discharges. The base of the valve stem orifice typically has a tapered counterbore that can seal against the complimentary tapered end of a properly tightened appliance coupling. A typical appliance is a barbecue grill which requires a source of gas.

The Type 1 connection valve unit has a dual-seal valve with an internal backcheck valve module that is secondary to the handwheel operated primary seal. The Type 1 connection valve handwheel, even when opened, will not discharge a gas, such as propane, unless an appliance coupling is inserted. Specifically, the backcheck valve in the backcheck valve module blocks an outflow of gas unless an appliance coupling is inserted, which pushes the backcheck valve into an open position and allows gas to flow from the tank.

When POL valves are not in service they typically are sealed with a plug. These POL plugs are screwed into the internal left-hand thread that is typical of POL valve valve stems. Further, these plugs typically have end portions shaped similarly to an appliance coupling, and seal similarly against the tapered valve stem orifice counterbore. These plugs sometimes incorporate an O-ring which forms a seal against the tapered valve stem orifice counter bore. The new style Type 1 connection valve valve stem has internal left-hand threads similar to the old style POL valve, but also has an external thread on the walls forming the valve stem through which gas is supplied. A dust cap can be fastened to these external threads when the tank is not in service. However, because the internal threads are similar or the same on POL valves and Type 1 connection valves, the old style POL plug can also be screwed into the Type 1 connection valve. When this happens, the plug can come into contact with the backcheck valve and thereby push the valve into open position which can allow gas to leak from the tank if the handwheel is not completely closed. This can also permanently damage the backcheck valve. The additional protection that is intended by the backcheck valve is thereby overridden. To try and avoid this problem, tanks with Type 1 connection valves often include dust caps fastenable to the external threads and information on the use of dust caps and non-use of a plug to protect the orifice.

Therefore, presently, suppliers of pressurized gas tanks need to order, make available, and use two different types of protective devices for out-of-service pressurized gas tanks, a dust cap device for Type 1 connection valves, and a POL plug for POL valves. Further, the use of two devices including the old style POL plugs can allow for the detrimental, accidental use of POL plugs in Type 1 connection valves.

Accordingly, there is a need for a single type of gas tank valve plug that would safely and effectively fit both a Type 1 connection valve and a POL valve.

SUMMARY OF THE INVENTION

In one embodiment of the present invention there is provided a gas tank valve plug including a handle having a neck, the neck having an undersurface. The valve plug also includes a shaft having a longitudinal axis, the shaft further has an end opposite the neck. The diameter of the shaft is less than the diameter of the neck, and the length of the shaft along the longitudinal axis from the undersurface of the neck to the end of the shaft is less than an interior depth of a Type 1 connection valve stem.

In another embodiment of the invention there is provided a gas tank valve plug including a shaft separately fittable within an orifice of a valve stem of a Type 1 or first pressurized gas tank valve and an orifice of a valve stem of a POL valve or a second pressurized gas tank valve, each valve stem having an internal depth, wherein the internal depth of the valve stem of the Type 1 pressurized gas tank valve is shallower than the internal depth of the valve stem of the POL pressurized gas tank valve. Additionally, the portion of the shaft fittable within the orifice of the valve stem of the Type 1 pressurized gas tank valve and the orifice of the valve stem of the POL pressurized gas tank valve is shorter than the shallower internal depth of the valve stem of the Type 1 pressurized gas tank valve. The valve plug also includes a surface sealably engageable with the valve stem of the Type 1 pressurized gas tank valve and sealably engageable with the valve stem of the POL pressurized gas tank valve.

The sealably engageable surface can include an underside of a handle or a seal interposed between the pressurized gas tank valve plug and the Type 1 or POL pressurized gas tank valve.

In another embodiment of the present invention there is provided a pressurized gas tank valve plug system which includes the pressurized tank valve plug described above and the Type 1 pressurized gas tank valve.

In another embodiment of the present invention there is provided a pressurized gas tank valve plug system which includes the pressurized tank valve plug described above and the POL pressurized gas tank valve.

In accordance with another aspect of the present invention there is provided a method for simplifying the sealing of a Type 1 pressurized gas tank valve and a POL pressurized gas tank valve comprising the step of providing a pressurized gas tank valve plug having a shaft fittable within a valve stem of the Type 1 pressurized gas tank valve and a valve stem of the POL pressurized gas tank valve, such that the shaft will not damage or open a backcheck valve contained within the Type 1 pressurized gas tank valve stem.

In preferred embodiments the Type 1 and POL pressurized gas tank valves are valves for propane storage tanks.

In preferred embodiments non-sparking materials such as plastic can be used to form the pressurized gas tank valve plugs of the present invention.

DESCRIPTION OF THE FIGURES

A brief description of the drawings is as follows.

DETAILED DESCRIPTION OF THE INVENTION

The detailed description of the invention will be made with reference to the accompanying drawings, where like numerals designate corresponding parts of the figures.

Figure 1:
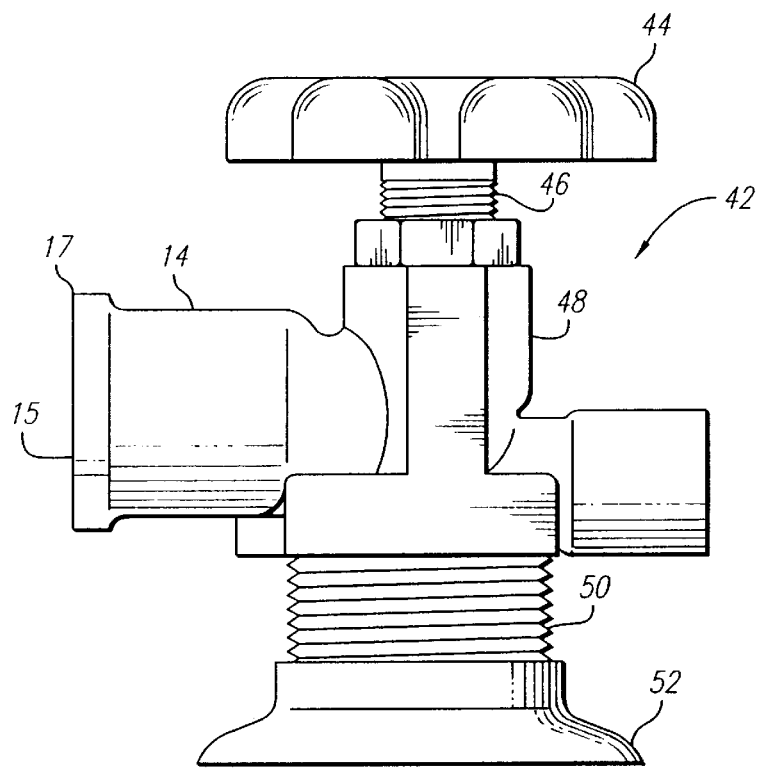
FIG. 1 depicts a POL pressurized gas tank valve unit.

FIG. 1 illustrates generally a POL pressurized gas tank valve unit 42 which includes a handwheel 44 for raising and lowering a stem 46 which opens and closes a valve in housing 48. Threaded portion 50 threadably engages a source of pressurized gas 52. Valve stem or outlet housing 14 includes an outer face 17 and an orifice 15 which is in communication with the valve in housing 48. When valve unit 42 is, for example, a POL valve unit, valve stem 14 typically lacks external threads and orifice 15 lacks any additional safety valve mechanisms, as illustrated and described further below.

Figure 2:
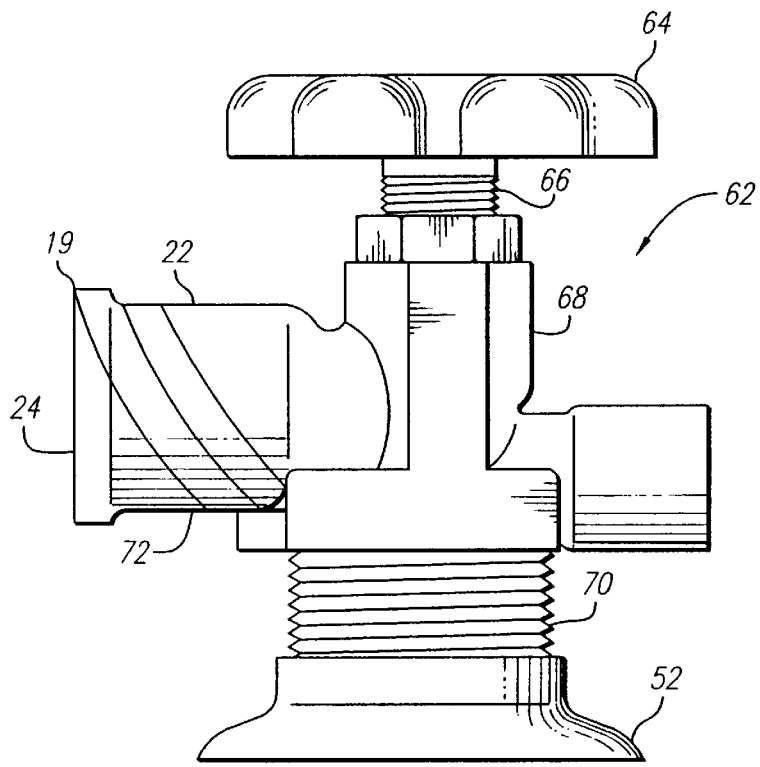
FIG. 2 depicts a Type 1 pressurized gas tank valve unit.

FIG. 2 illustrates generally a Type 1 pressurized gas tank valve unit 62 which includes a turnwheel 64 for raising and lowering a stem 66 which opens and closes a valve in housing 68. Threaded portion 70 threadably engages a source of pressurized gas 52. Valve stem 22 includes an outer face 19 and an orifice 24 which is in communication with the valve in housing 68. When valve unit 62 is, for example, a Type 1 connection valve unit, valve stem 22 includes external threads 72 and orifice 24 includes an additional safety valve mechanism, as illustrated and described further below.

Figure 3:
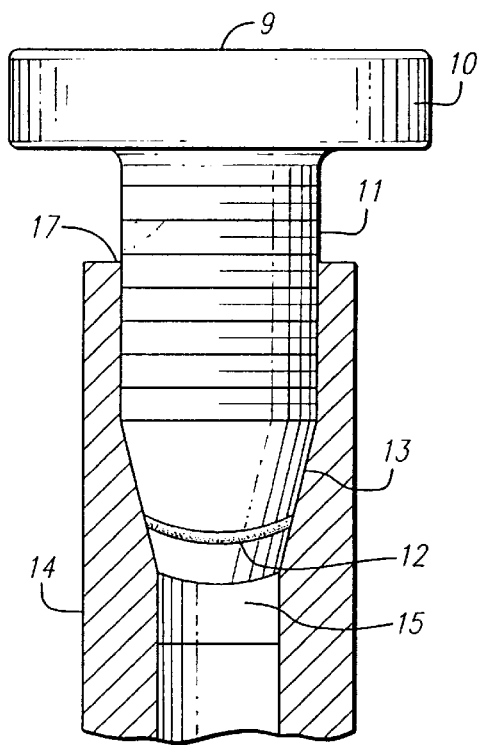
FIG. 3 depicts a cross-sectional view of the valve stem of, for example, a POL valve with a prior art gas tank valve plug threaded therein. A sealing engagement is illustrated between a bottom aspect of the tank valve plug and an interior base of the valve stem.

FIG. 3 illustrates a prior art pressurized gas tank valve plug 9 comprised of a handle portion 10, a threaded shaft 11, and, optionally, a seal 12 engaged on said threaded shaft 11. The plug is inserted within orifice 15 of, for example, valve stem 14 of a POL valve unit 42. Threaded shaft 11 is in threaded engagement with an interior of sidewall 13 of, for example, POL valve stem 14.

Figure 4:
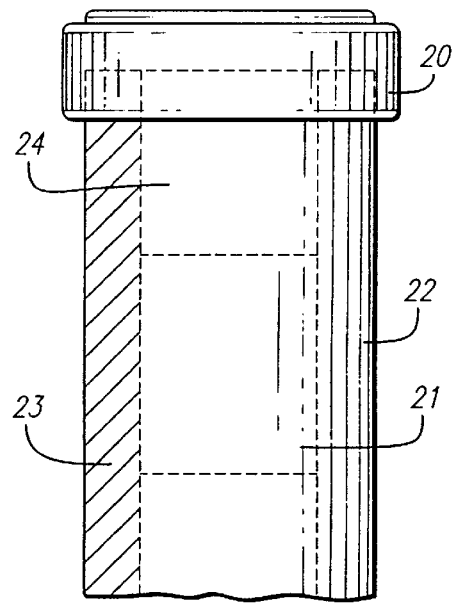
FIG. 4 depicts a cross-sectional view of, for example, a Type 1 connection valve stem having threaded thereon a protective cap, the need for which is eliminated by the present invention.

FIG. 4 illustrates a prior art protective cap 20 in place over orifice 24 of, for example, valve stem 22 of a Type 1 connection valve unit 62. Cap 20 engages exterior threads (as shown in FIG. 2) on valve stem 22. Backcheck valve module 21 is seated in place in orifice 24 and in proximity to side wall 23 of Type 1 connection valve stem 22.

The pressurized gas tank valve plug of the present invention can seal two types of pressurized gas tank valve, each of which contain a distinct type of valve stem, without damaging any interior structure contained within an orifice of the valve stem.

The valve stems differ in an internal depth of the valve stem, one depth being shallower than the other. The internal depth of the valve stem can be measured from an outer face of the valve stem to the lowest point within the orifice to which a valve plug inserted therein could travel to and just barely contact that point. For example, Type 1 pressurized gas tank valve stem 22 has an interior depth of orifice 24 measured from the lowest point within the orifice which is the top of a device such as backcheck valve module 21 within orifice 24 to the surface of outer face 19 of valve stem 22. This internal depth is shallower than an internal depth of a POL pressurized gas tank valve stem 14 measured from the lowest point of an inner beveled base 16 to the surface of outer face 17. In a particular embodiment of the invention, the Type 1 pressurized gas tank valve stem is part of a Type 1 connection valve unit, typically used with propane tanks and the POL pressurized gas tank valve stem is part of a POL valve unit, typically used with propane tanks. The valve stem of a Type 1 connection valve unit has an outside diameter across an outer face 19 of about 1 and $1/16$ inches, and an inner diameter across outer face 19 of about $13/16$ of an inch. The interior depth of a Type 1 connection valve stem is about $9/16$ of an inch when backcheck valve module 21 is seated at its deepest depth within the valve stem. The valve stem of a POL valve unit has an outside diameter across an outer face 17 of about 1 and $3/16$ inches, and an inner diameter across outer face 17 of about $13/16$ of an inch. The interior depth of a POL valve stem is about $15/16$ of an inch measured from outer face 17 to the lowest point of the beveled portion of the interior of the valve stem.

It is to be understood that the invention is not limited to propane tank valves, but includes any tank valves with similar configurations such that essentially the same tank valve plug of the present invention could be utilized, and includes the plugging of valves wherein the tank valve plug of the present invention could be utilized with modifications as could be made by one of ordinary skill in the art without undue experimentation. In that regard a "Type 1 pressurized gas tank valve" is an example of "a first pressurized gas tank valve" and a "POL pressurized gas tank valve" is an example of "a second pressurized gas tank valve."

Figure 5:
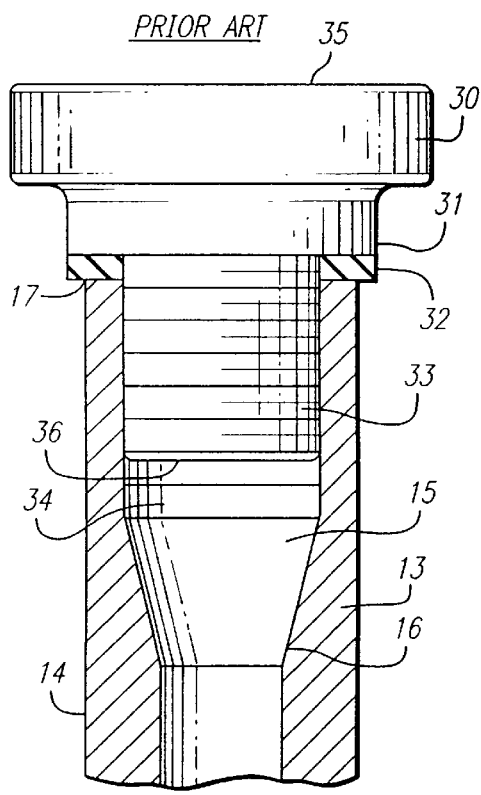
FIG. 5 depicts a cross-sectional view of the pressurized gas tank valve plug of the present invention in sealing engagement with, for example, a POL valve stem wherein the sealable engagement between the plug and the valve stem occurs between an outer face of the valve stem and an upper portion of the plug.

FIG. 5 illustrates a particular embodiment of the present invention. Pressurized gas tank valve plug 35 is comprised of a handle 30, a neck 31, a seal 32, a shaft 33, and is secured within orifice 15 of valve stem 14. Pressurized gas tank valve plug 35 of the present invention is a device which is used to seal off an orifice of a valve stem of a pressurized gas tank. The pressurized gas tank can contain various gases; such as hydrocarbons and in particular propane.

Handle 30 is a device which allows a force, preferably a torque, to be imparted to pressurized gas tank valve plug 35. The handle 30 is in force-transferable relation with the shaft 33 so that shaft 33 is in contact with handle 30 either directly or indirectly, such that a force, particularly a torque, applied to handle 30 will result in a force, such as a torque, applied to shaft 33. Handle 30 and shaft 33 can be integral or separate and joined by, for example, a weld, an adhesive, a direct threaded engagement, a screw, a bolt or some combination thereof. Handle 30 can be, but is not limited to a spherical shape, a planar shape with any of a variety of perimeter designs, and can be knurled, or smooth. Handle 30 can comprise a top and neck 31 as in, for example, FIGS. 5 and 6, however, it is not limited to this particular configuration. Handle 30 can be integrally formed with other elements of plug 35 such as shaft 33 or it can be fitted to such other elements, by, for example, chemical means such as adhesives; mechanical means such as screws, bolts, threaded shafts; or it can be welded together. Handle 30 can be formed by milling, drop-forging, stamping, molding, die casting or other means as are known in the art.

Alternatively, shaft 33 can be formed without an integral handle, rather shaft 33 can have a slot or an indentation which, for example, can engage a tool which can rotate shaft 33 such as a screw driver or an Allen wrench. Alternatively, shaft 33 can have a faceted upper portion which can engage, for example, a wrench.

Handle 30 can include a surface such as an underside of neck 31 suitable for sealable engagement with a pressurized gas tank valve stem. The handle underside surface is preferably smooth more preferably smooth and flat. Neck 31 can be beveled to provide for sealing engagement with an interior surface of orifice 15 or 24 of pressurized gas valve stem 14 or 22. Neck 31 preferably has a diameter larger than a diameter of shaft 33. Neck 31 need not be integral with handle 30, it can be integral with shaft 33. If neck 31 is not integral with handle 35 or shaft 33, that is it is free to move relative to handle 30 or shaft 33, it would comprise a seal 32 as described below. Rough, non-flat surfaces of handle 30, particularly the underside of handle 30, can function in conjunction with suitably modified seals.

Shaft 33 is separately and preferably reversibly fittable within orifice 15 and orifice 24 so that it can be inserted and removed from each orifice. Shaft 33 can be reversibly fittable in all of the foregoing ways. Shaft 33 adjacent handle 30 is preferably threaded, allowing for threading engagement with a threaded female receptacle. In preferred embodiments the thread is left-handed. However, shaft 33 can be only partially threaded, such that an upper portion of shaft 33 which can extend above the outer face 17 or 19 of valve stem 14 or 22 can be non-threaded. In alternative embodiments the entire shaft 33 can be non-threaded, but can engage the inner walls of valve stem 14 or 22 through friction or through, for example, spring loaded knobs which are pushed out from the surface of shaft 33 along some length of shaft 33 and engage an interior wall of valve stem 14 or 22. Alternatively, outer face 17 of valve stem 14 and outer face 19 of valve stem 22 can extend past the outer walls of valve stem 14 and 22 and clamps can affix the plug 35 to valve stem 14 or 22 thereto.

Shaft 33 can be in contact with handle 30 either directly or indirectly, such that a torque applied to handle 30 will result in a torque applied to shaft 33. The handle 30 and shaft 33 can be integral or separate and joined by, for example, a weld, an adhesive, a direct threaded engagement, a screw, a bolt or some combination thereof.

That portion of shaft 33 of plug 35 which fits within orifice 15 of valve stem 14 and orifice 24 of valve stem 22 preferably has a length not exceeding that of an internal depth of the shallower of two pressurized gas tank valve stem orifices as defined above. In particular, the portion of shaft 33 which fits within a valve stem orifice from an end of shaft 33 opposite neck 31 has a length along a longitudinal axis of shaft 33 from an undersurface of neck 31 to the end of shaft 33 which is less than an interior depth of a Type 1 connection valve stem.

A portion of shaft 33 can extend above outer face 17 or outer face 19. Accordingly, when shaft 33 is inserted to the maximum extent possible into a Type 1 connection valve stem, the base 36 of shaft 33 will not contact or will barely contact, for example, the backcheck valve module 21, so that no damage is done thereto, and/or the valve is not opened. To the extent that a seal 32 is interposed between the underside of handle 30 and an outer face 17 or 19 of pressurized gas tank valve stem 14 or 22, and thereby elevates shaft 33, shaft 33 can be lengthened so long as that portion of shaft 33 within the orifice will still not contact or will barely contact the base of any device within the orifice of the valve such as a backcheck valve module 21, so that no damage is done thereto and/or the valve is not opened.

Shaft 33 preferably has a diameter at least partially sealingly engageable with orifice 15 and orifice 24 of valve stem 14 and valve stem 22 such that shaft 33 is not so large in diameter so as not to be able to functionally fit within orifice 15 and orifice 24 of valve stem 14 and valve stem 22. Nor should the diameter be so small so as to allow for a wobble of shaft 33 within valve orifice 15 and valve orifice 24. That is, shaft 33 should fit securely, such that it can function to at least partially seal the gas tank valve, so that no appreciable amount of gas escapes and no appreciable amount of debris can enter. Alternatively, shaft 33 need not appreciably seal gas in and dirt out, if handle 30 and/or neck 31 and/or an additional seal perform these functions entirely.

In one embodiment, shaft 33 can include a pressure relief hole which allows any gas which can have built up to vent out as plug 35 is removed from orifice 15 or 24 of valve stem 14 or 22. The pressure relief hole should preferably allow venting to occur while shaft 33 is still sufficiently engaged by, for example, threaded engagement with valve stem 14 or 22, so that any gas pressure built up does not blow the plug out of the orifice before venting can occur.

Seal 32 is preferably adjacent the handle 30. Seal 32 is preferably a compressible material which helps to prevent leakage of gas through valve stem 14 or 22. The compressible material can be, for example, rubber, cork, synthetic composites, soft metals, such as lead and the like as would known to one of ordinary skill in the art. Seal 32 can be affixed to the underside of handle 30 by, for example adhesives or by frictional forces or can be relatively loose and be held in place by its interposition between handle 30 and valve outer face 17 or 19. Seal 32 can be continuous, as for example, a rubber O-ring or discontinuous as in a string of material which can be wrapped about the pressurized gas tank valve plug 35 at for example the juncture of handle 30 and shaft 33.

Seal 32 need not be in contact with handle 30, although, in a preferred embodiment, seal 32 is interposed between an underside of handle 30 and an outer face 17 of, for example, a POL valve stem 14 or an outer face 19 of, for example, a Type 1 connection valve stem 22. The placement of seal 32 in this location allows for the sealing of, for example, both a Type 1 connection propane gas tank valve and a POL valve. This is so because due to the backcheck valve module 21 used in, for example, Type 1 connection propane gas tank valve stems, a sealing engagement at an inner beveled base of a valve stem as in, for example, a POL valve could not be achieved. However, both, for example, POL valves and Type 1 connection valves have a valve stem having an outer face suitable for sealable engagement.

Less preferably, a sealing material can be affixed adjacent the bottom of threaded shaft 33 of plug 35 so that when plug 35 is fit into orifice 15 of, for example, a POL valve stem 14 it seals at the base of valve stem 14 and when fit into orifice 24 of a Type 1 connection valve stem 22 it will not damage backcheck valve module 21 or inadvertently open the backcheck valve, because of the resiliency of the sealing material.

In an alternative embodiment seal 32 can be located on the underside of handle 30 and in sealing engagement with an interior surface of the wall of valve stem 14 or 22. In such an embodiment seal 32 can also be in contact with shaft 33. In a preferred embodiment seal 32 is a rubber O-ring.

Additionally, in other alternative embodiments seal 32 can be disposed anywhere along the length of shaft 33, such that it is in sealing engagement between shaft 33 and an interior surface of valve stem 14 or 22.

Seal 32 can, for example, be held in place by friction or can be affixed by, for example, an adhesive. However, to the extent such placement can cause increased friction in inserting the pressurized gas tank valve plug 35 and/or additionally can increase the possibility of damaging a seal so disposed, alternative placement can be preferred.

A gap 34 exists between a lower face 36 of shaft 33 and inner beveled base 16 of valve stem 14 as shaft 33 is shorter than the prior art plug shaft 11. However, a lower face of neck 31 and/or seal 32 provides for sealing engagement between pressurized gas tank valve plug 35 and outer face 17 of POL style propane gas tank valve stem 14.

Figure 6:
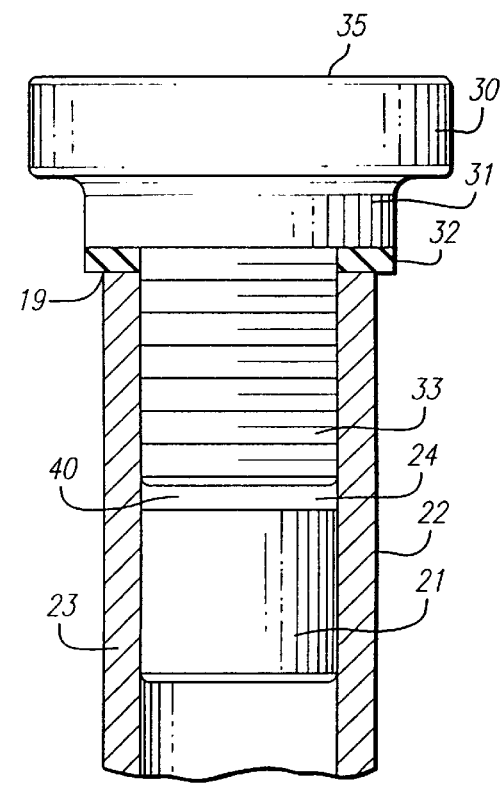
FIG. 6 depicts a cross-sectional view of the pressurized gas tank valve plug of the present invention in sealing engagement with, for example, a Type 1 connection valve wherein the sealable engagement between the plug and the valve stem occurs between an outer face of the valve stem and an upper portion of the plug.

FIG. 6 illustrates a particular embodiment of the present invention. Propane gas tank valve plug 35 comprised of a handle 30, a neck 31, a seal 32, a shaft 33, preferably threaded, is secured within orifice 24 of, for example, valve stem 22 of a Type 1 connection valve 62 unit. Pressurized gas tank valve plug 35 preferably has exterior threads (not shown) on valve stem 22. A gap 40 exists between the lower face 36 of shaft 33 and backcheck valve module 21 as shaft 33 is shorter than prior art shaft 11. Attempts to insert prior art gas tank valve plug 9 into orifice 24 of valve stem 22, could damage, for example, the backcheck valve module 21 outer seal or push backcheck valve module 21 into the open position, possibly resulting in dangerous leaks of possibly flammable pressurized gas.

While the description above refers to particular embodiments of the present invention, it will be understood that many modifications can be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A universal valve plug comprising:
   a) a handle;
   b) a neck, said neck having an undersurface; and
   c) a shaft having a longitudinal axis, said shaft further having an end opposite said neck, wherein a diameter of said shaft is less than a diameter of said neck, and wherein a length of said shaft along said longitudinal axis from said undersurface of said neck to said end of said shaft is less than an interior depth of an outlet housing of a first type valve; and
   wherein the valve plug is interchangeably fittable within the outlet housing of the first type valve and an outlet housing of a second type valve, such that said end of said shaft will extend a certain distance within said outlet housing of said first type valve and will not open an interior valve disposed therein when said valve plug is sealingly secured within said outlet housing of said first type valve.

2. The valve plug of claim 1 wherein said shaft is threaded.

3. The valve plug of claim 1 wherein said interior depth is about 9/16 of an inch.

4. A gas tank valve plug system comprising the valve plug of claim 1 and a pressurized gas tank valve.

5. The gas tank valve plug system of claim 4 wherein said pressurized gas tank valve comprises a Type 1 valve connection.

6. The gas tank valve plug system of claim 4 wherein said pressurized gas tank valve comprises a POL type valve.

7. A universal valve plug interchangeably fittable within an outlet housing of a first type valve and an outlet housing of a second type valve, said valve plug comprising:
   a) a shaft separately fittable within the outlet housing of said first type valve and the outlet housing of said second type valve, each outlet housing having an interior depth, wherein said interior depth of said outlet housing of said first type valve is shallower than said interior depth of said outlet housing of said second type valve, further wherein said portion of said shaft fittable within said outlet housing of said first type valve and said outlet housing of said second type valve is shorter than said shallower interior depth of said outlet housing of said first type valve, such that said end of said shaft will not open an interior valve contained in said outlet housing of said first type valve; and
   b) a surface interchangeably and sealably engageable with an outer surface of said outlet housing of said first type valve and an outer surface of said outlet housing of said second type valve.

8. The valve plug of claim 7 wherein said first type valve comprises a Type 1 valve connection and said second type valve comprises a POL type valve.

9. The valve plug of claim 7 wherein said shaft portion is threaded.

10. The valve plug of claim 7 wherein said interior depth of said outlet housing of said first type valve is about 9/16 of an inch.

11. The valve plug of claim 7 wherein said shaft includes a portion engageable by a tool which can rotate said shaft.

12. The valve plug of claim 7 further comprising a handle.

13. The valve plug of claim 7 wherein said sealably engageable surface comprises an underside of a handle.

14. The valve plug of claim 7 wherein said sealably engageable surface comprises a seal interposed between said valve plug and said first or said second type valve.

15. The valve plug of claim 14 wherein said seal is adjacent to an underside of a handle.

16. The valve plug of claim 14 wherein said seal is adjacent to said shaft.

17. The valve plug of claim 7 wherein said sealably engageable surface sealably engages an outer face of said outlet housing of said first type valve and an outer face of said outlet housing of said second type valve.

18. A pressurized gas tank valve plug system comprising the valve plug of claim 7 and said first type valve.

19. The pressurized gas tank valve plug system of claim 18 wherein said first type valve comprises a Type 1 valve connection.

20. A pressurized gas tank valve plug system comprising the valve plug of claim 7 and said second type valve.

21. The pressurized gas tank valve plug system of claim 20 wherein said second type valve comprises a POL type valve.

22. A method for preventing damage to a pressurized gas tank valve comprising the step of providing a universal valve plug to a user of a pressurized gas tank wherein said valve plug has a shaft interchangeably fittable within an outlet housing of a first pressurized gas tank valve and an outlet housing of a second pressurized gas tank valve, each outlet housing having an interior depth, wherein said interior depth of said outlet housing of said first pressurized gas tank valve is shallower than said interior depth of said outlet housing of said second pressurized gas tank valve, wherein said shaft will not damage or open an interior valve contained within said first pressurized gas tank outlet housing when said valve plug is fully inserted therein, and wherein a surface portion of said valve plug is adapted to engage a surface portion of said outlet housing of said first and second pressurized gas tank valves.

23. A gas tank valve plug comprising:

a) a handle;

b) a neck, said neck having an undersurface; and c) a shaft, the shaft further having an end opposite the neck, wherein a diameter of the shaft is less than a diameter of the neck;

wherein the end of the shaft will not open an interior valve provided in an outlet housing of a Type 1 valve connection when the undersurface of the valve plug is sealed against an outer face of the outlet housing of the Type 1 valve connection; and wherein the valve plug is also fittable within an outlet housing of a POL type valve, such that the undersurface of the valve plug is sealably engageable with an outer face of the outlet housing of the POL type valve.

* * * * *